United States Patent [19]

Matsubara et al.

[11] Patent Number: 4,619,959

[45] Date of Patent: Oct. 28, 1986

[54] CONTINUOUS PRODUCTION PROCESS OF STYRENE-BASE RESIN

[75] Inventors: Tetsuyuki Matsubara; Norifumi Ito; Kazuo Sugazaki; Kouzo Ichikawa; Mune Iwamoto; Toshihiko Ando, all of Yokohama, Japan

[73] Assignees: Mitsui Toatsu Chemicals, Incorporated; Toyo Engineering Corporation, both of Tokyo, Japan

[21] Appl. No.: 737,531

[22] Filed: May 24, 1985

[30] Foreign Application Priority Data

May 28, 1984 [JP] Japan ................................. 59-106555
Jun. 8, 1984 [JP] Japan ................................. 59-116501

[51] Int. Cl.$^4$ ..................... C08F 12/08; C08F 291/02; C08F 2/44; C08K 5/20
[52] U.S. Cl. .................................. 524/228; 524/231; 524/232; 524/504; 524/505; 524/534; 524/714; 524/726; 524/727; 524/728
[58] Field of Search ............... 524/228, 232, 714, 728, 524/726, 504, 505, 231, 727, 534

[56] References Cited

U.S. PATENT DOCUMENTS

| | | | |
|---|---|---|---|
| 3,935,143 | 1/1976 | Takahashi et al. | 524/228 |
| 4,248,778 | 2/1981 | Arnold et al. | 524/311 |
| 4,277,574 | 7/1981 | Jastrzebski et al. | 525/86 |
| 4,461,865 | 7/1984 | Maeda et al. | 524/441 |

FOREIGN PATENT DOCUMENTS

| | | | |
|---|---|---|---|
| 0028978 | 8/1971 | Japan | 524/231 |
| 0008366 | 3/1972 | Japan | 524/228 |
| 0128047 | 12/1974 | Japan | 524/228 |

*Primary Examiner*—Herbert J. Lilling
*Attorney, Agent, or Firm*—Fisher, Christen & Sabol

[57] ABSTRACT

A process for producing a styrene-base resin having improved moldability and a good hue by continuously adding a specific higher fatty acid amide in a dissolved or molten state, and/or a mixture of a specific higher fatty acid amide and a specific metallic soap in a molten state, to a styrene-base resin in the course of its production by continuous bulk or solution polymerization. The above process is particularly effective for rubber-modified styrene-acrylonitrile resins.

10 Claims, No Drawings

CONTINUOUS PRODUCTION PROCESS OF STYRENE-BASE RESIN

BACKGROUND OF THE INVENTION (1) Field of the Invention

This invention relates to a continuous production process of a styrene-base resin, especially, rubber-modified styrene-acrylonitrile resin having improved moldability.

(2) Description of the Prior Art

Rubber-modified styrene-acrylonitrile resins (ABS) are used for a wide variety of applications because their properties such as impact strength, stiffness, moldability, dimensional stability and the like are well-balanced. Reflecting the expansion of their application fields in recent years, there is a tendency toward greater, more complex and/or thinner molded articles. In order to meet such a recent trend, it is desired to improve the moldability of resins. For this purpose, it is widely practised to improve the moldability by adding higher fatty acid amides and/or metallic soaps. Turning to production processes of resins, batchwise polymerization processes relying upon emulsion polymerization or suspension polymerization have heretofore been employed. In each of such processes, a solid resin formed in accordance with batchwise polymerization is subjected to two additional steps prior to obtaining the final resin product, namely, the solid resin is blended with one or more of the above-mentioned additives and the resultant resin mixture is kneaded in an extruder or the like (see, for example, Japanese Patent Publication No. 23182/1973). Each of such processes however requires a great deal of labor and substantial facilities. There is thus a strong demand for the development of an improved method for the addition of such additives.

Incorporation of a large amount of such a moldability-improving additive in a resin by such a method will usually lead to insufficient feeding, reduced productivity and/or insufficient mixing if a conventional extruder is employed. To cope with this problem, it will be necessary, for example, to extrude the resin and additive twice.

Furthermore, a resin obtained by emulsion polymerization or the like contains, as impurities, residues of emulsifier, coagulant and the like. When such a moldability-improving additive is added to such a resin, the hue of the resin will be rendered poorer due to its heat history or the like and the resulting molded article will have inferior thermal discoloration resistance. An additional incorporation of a stabilizer such as an organic phosphorous acid ester is thus needed (see, for example, Japanese Patent Publication No. 45192/1972).

In the production of large and thin-walled molded articles having complex configurations, they may be cracked at portions corresponding to ejector pins or at corner areas upon taking them out of their corresponding molds, thereby failing to provide good molded articles. To cope with this problem, the mold release properties of such molded articles from their corresponding molds are improved by coating a silicone-type mold release agent or the like on the inner surfaces of the molds or adding a mold release agent such as a higher fatty acid or a metallic soap thereof. Even when such a silicon-type mold release agent or the like is coated on the inner surface of a mold, its effects last shortly. It is therefore necessary to coat such a mold release agent prior to each molding shot or even in the most successful case, still as often as every 10th molding shot. Use of such a mold release agent is hence time-consuming and moreover, it cannot be considered to be an advantageous method from the economical viewpoint. When higher fatty acids are used as mold release agents on the other hand, mold release properties can certainly be improved. However, use of higher fatty acids results in corrosion of extruders and molding machines, adhesion of deposit to die nozzles or molds upon extrusion or molding, sacrificed hues of products, thermal discoloration, etc. Therefore, it cannot be considered to be a preferred method.

On the other hand, metallic soaps of higher fatty acids, especially, their calcium soaps, magnesium soaps and the like have viscosities as high as several hundred thousands poises in molten state. It is therefore difficult to add them in molten state by usual pumps.

SUMMARY OF THE INVENTION

An object of this invention is to provide a process for efficiently producing a styrene-base resin, especially, rubber-modified styrene-acrylonitrile resin, which has improved moldability and a good hue, by continuous bulk polymerization or continuous solution polymerization.

Another object of this invention is to provide a process for producing a styrene-base resin, which features less adhesion of deposit, by continuous bulk polymerization or continuous solution polymerization.

A further object of this invention is to provide a process for producing a styrene-base resin, the thermal discoloration resistance of which has been improved without any appreciable reduction in heat resistance, by continuous bulk polymerization or continuous solution polymerization.

The following continuous production process of a styrene-base resin is provided by the present invention.

In a process for producing a styrene-base resin by continuous bulk polymerization or solution polymerization, the improvement wherein in the course of the process, one or more higher fatty acid amides represented by the following formula (I):

$$R_1CONHR_2 \qquad (I)$$

wherein $R_1$ is an alkyl group having 8–22 carbon atoms, $R_2$ means a hydrogen atom, hydroxymethyl group or $NHCOR^3$ ($R^3$ is an alkyl group having 8–22 carbon atoms and may be same as or different from $R_1$; and n is 1 or 2) are continuously added in dissolved or molten state to a continuous flow of the styrene-base resin in a molten or dissolved state so that a styrene-base resin having excellent moldability and a good hue is produced.

DETAILED DESCRIPTION OF THE INVENTION

By the term "rubber-modified styrene-acrylonitrile resin" as used herein is meant a resin obtained by polymerizing styrene and acrylonitrile in the presence of a rubber or rubber-like polymer (hereinafter referred to as "rubbery polymer"). In such a resin, the styrene component may be replaced either partly or even entirely by a derivative of styrene, for example, α-methylstyrene, o-, m- or p-methylstyrene, a halogen-substituted styrene or the like. It may also be feasible to replace either some or entire part of the acrylonitrile component by a cyanated vinyl such as methacrylonitrile or α-chloroacrylonitrile. The resin may additionally contain one or more other copolymerized monomer components, for example, acrylic acid or methacrylic acid, an alkyl ester thereof such as methyl methacrylate, maleic anhydride and/or the like.

The term "continuous bulk or solution polymerization" as used herein is a process known per se in the art. According to continuous bulk or solution polymerization, a monomer is continuously fed singly, as a liquid mixture with a solvent or as a solution with a rubbery polymer such as polybutadiene dissolved in such a liquid mixture to one or more reaction vessels to subject it to a polymerization reaction, the polymerization mixture is continuously drawn out of the reaction vessels after completion of the polymerization, the unreacted monomer and solvent are removed at elevated temperature and in vacuo, and the resultant resin is pelletized through an extruder or the like.

By the term "a continuous flow of the styrene-base resin in a molten or dissolved state in the course of the process" as used herein, is meant a flow of the styrene-base resin in the series of steps which starts with the flow of the above-described rubbery polymer and ends up with the step in which the styrene-base resin is obtained in a pelletized state. Therefore, this term refers for example to the styrene-base resin in its polymerization step, removal step for volatile components, extrusion step or any one of the flow lines connecting these steps.

Higher fatty acid amides useful in the practice of this invention must be amide compounds represented by the formula (I). Illustrative of the compounds represented by the formula (I) include lauric acid amide, stearic acid amide, behenic acid amide, methylenebislauric acid amide, ethylenebislauric acid amide, methylenebisstearic acid amide, ethylenebisstearic acid amide, methylenebisbehenic acid amide, and ethylenebisbehenic acid amide. Two or more of these higher fatty acid amides may be used as a mixture.

As the rubbery polymer, any rubbery polymer may be used so long as it can be dissolved in monomers useful for the production of the above polymers or their mixtures. It is possible to use, for example, butadiene rubber, copolymerized styrene-butadiene rubber, copolymerized acrylonitrile-butadiene rubber, chloroprene rubber, copolymerized ethylene-propylene rubber, copolymerized ethylene-propylene-diene rubber, etc.

In the process of this invention, the additive of this invention is continuously added to a continuous flow of the molten or dissolved resin in the course of the continuous process. Upon effecting the continuous addition, the higher fatty acid amide represented by the general formula (I) is added in a dissolved or molten state and/or the mixture of the higher fatty acid amide and metallic soap is added in a molten state. Since the additive useful in the practice of this invention is added to the resin in a flowing state while maintaining its flowability, the composition of the additive can be kept uniform along the passage of time, the state of its mixing can be maintained extremely good, and it does not affect the polymerization reaction, thereby resulting in products of extremely high quality. Furthermore, the addition can be achieved readily by a fixed displacement pump without need for blending facilities and additive-kneading facilities in the addition step. In the process of this invention, the continuous addition of such an additive may be effected at one or more stages. As the additive, it is possible to add such a higher fatty acid amide singly, or such a higher fatty acid amide and metallic soap either simultaneously as a mixture or separately.

In this invention, the addition of the higher fatty acid amide in a dissolved or molten state may be effected after dissolving it in a monomer, solvent or the like or melting it at a temperature above its melting point. It is preferred to add the higher fatty acid amide by heating it to 60° C. or higher and either dissolving or melting the same. Among the abovementioned various higher fatty acid amides, it is preferable to employ ethylenebisstearic amide. When ethylenebisstearic amide is employed, it may singly be added after dissolving it at 130° C. or higher, or most preferably at 140° C-180° C. or even higher while holding it in a nitrogen atmosphere.

The higher fatty acid amide may be added in an amount of from 1.0 part by weight to 8.0 parts by weight or preferably from 1.5 parts by weight to 6.0 parts by weight, both per 100 parts by weight of the resin. Any amounts less than 1.0 part by weight will not improve the moldability of the resin to any significant degree, whereas any amounts in excess of 8.0 parts by weight affect adversely on other properties of the resin, for example, lower the tensile strength, hardness, etc. It is thus not preferred to add the higher fatty acid amide in any amounts outside the above range. The process of this invention is particularly effective for maintaining the composition of the resulting resin mixture uniform along the passage of time and making the state of its mixing better upon adding the higher fatty acid amide in the above-mentioned effective amount or especially in an amount of 1.5 parts by weight or more.

The higher fatty acid amide may be added at any stage or stages along the continuous steps. It is however preferred to add the higher fatty acid amide in an amount of 10-10,000 parts by weight, or preferably 15-2,000 parts by weight or more preferably 20-200 parts by weight to 100 parts by weight of the resin before the removal and evaporation step in which the monomers and solvent are removed from the resin. Specifically, it is preferred to add the higher fatty acid amide to one of the reaction vessels or to the pass line between the final reaction vessel and the removal and evaporation step. When the higher fatty acid amide is added to the pelletization step such as an extruder or the like, no problems will arise so long as it is added in a small amount. The extruder or the like may however undergo poor feeding or performance down if the amount of the higher fatty acid amide increases. If the higher fatty acid amide is added to the liquid reaction mixture before the removal and evaporation step, it can be thoroughly mixed in the resin. It is kneaded further into the resin in the course of the removal and evaporation step and pelletization step. Accordingly, it is possible to add the higher fatty acid amide as much as needed and in a well-kneaded state without lowering the production capacity of the resin. Since higher fatty acid amides such as those useful in the practice of the invention remain stable and non-volatile under the usual conditions of the removal and evaporation step, the thus-added higher fatty acid amides are allowed to remain substantially in their entirety in their associated resins. The higher fatty acids can thus be utilized effectively.

The process of this invention has brought above a significant improvement to the moldability owing to the addition of the higher fatty acid amide.

In some embodiments of the present invention, the mold release properties which affect molding work can be improved by adding a mixture of a higher fatty acid amide of the formula (I) and a metallic soap of a higher fatty acid having 8–22 carbon atoms in a molten state in the course of the process.

A metallic soap is solid at room temperature. In the absence of any higher fatty acid amide, its dissolution temperature is high and it is deteriorated when dissolved. When dissolved, the viscosity of the resultant solution is so high that it cannot feed by any usual pump. By causing it to melt together with one of the above-mentioned higher fatty acid amide, its deterioration can be avoided and its viscosity can be lowered. If such a metallic soap should be caused to melt together with another additive, for example, a fatty acid or the like, the fatty acid will be introduced in the resulting final resin and will thus develop deterioration such as thermal discoloration.

The mold release properties can be improved, for the first time, by using the higher fatty acid amide and the metallic soap of the higher fatty acid in combination. A metallic soap of a higher fatty acid, for example, a magnesium or calcium soap or the like cannot be continuously added in a molten state. Its addition in a molten state has been rendered feasible for the first time by its mixing with a fatty acid amide. In addition, the combination of these two components has brought about certain excellent effects which cannot be observed from the sole utilization of a metallic soap of a higher fatty acid. Namely, the combined use of the two components has resulted in improved resin flowability, improved product appearance, improved moldability, improved thermal discoloration resistance and the like.

In the process of this invention, a mixture of a metallic soap of a higher fatty acid and a fatty acid amide is used. Even when a mixture of a metallic soap of a higher fatty acid and a higher alcohol, higher fatty acid or a partial polyol ester of a fatty acid is used, the melting point of the metallic soap of the higher fatty acid and its viscosity in a molten state are both reduced so that the mixture can be continuously fed by a usual fixed displacement pump. However, use of such a mixture results in corrosion of extruders and molding machines and adhesion of deposit thereto and resins having reduced heat resistance, deteriorated hues and the like, and is not preferred.

As metallic soaps of higher fatty acids having 8–22 carbon atoms, may be mentioned aluminum stearate, calcium stearate, zinc stearate, magnesium stearate, calcium stearate and so on, with the calcium soap and magnesium soap being particularly preferred.

In a mixture of the fatty acid amide (a) and the metallic soap (b) of the fatty acid, the mixing proportions (a)/(b) in the mixture may preferably range from 10/90 to 90/10. If (a)/(b) should be smaller than 10/90, no significant reduction will be made to the melting point and melt viscosity of the metallic soap of the higher fatty acid and difficulties will be encountered upon adding it in a molten state by a conventional fixed displacement pump. If (a)/(b) should be greater than 90/10 on the other hand, the proportion of the metallic soap of the higher fatty acid is so small that the mold release properties will not be improved to any significant extent. Turning to the amount of the mixture to be added, it may be added in such an amount that 0.1–1.0 part by weight of the metallic soap will be contained per 100 parts by weight of the resin. Any metallic soap amounts less than 0.1 part by weight will result in poor mold release properties. Even if the mixture should be added in any amounts greater than 1.0 part by weight in terms of the metallic soap, the mold release properties will not be improved any further and will result in higher concentrations of the metallic soap in the resultant resins. It is thus not preferred to add the mixture in any amounts outside the above-described range. Two or more fatty acid amides or metallic soaps may be used in combination.

In this invention, the higher fatty acid amide or the mixture of the higher fatty acid amide and the metallic soap of the higher fatty acid may be added in the following manner. Namely, the higher fatty acid amide and the metallic soap of the higher fatty acid are mixed and are then heated and molten in advance. The thus-prepared molten mixture is continuously fed by a fixed displacement pump to an extruder or the like, where it is mixed and kneaded with the resin. It is preferred to add the molten mixture, for example, to an extruder, static mixer or the like after the removal and evaporation step of the unreacted monomers and solvent. When the mixture is added in a large amount so that it is difficult to mix and knead it sufficiently with the resin in the extruder, it may be fed to one of the reaction vessels or to the line between the final reaction vessel and the removal step for the unreacted monomers and solvent.

The mixture of the higher fatty acid amide and metallic soap which mixture is employed in this invention has a lowered viscosity in a molten state, thereby permitting its feeding by a usual fixed displacement pump. Since it is added to a continuous constant flow, it is unnecessary to incorporate such steps as blending. In addition, its feeding is effected at a constant rate so that extremely stable product can be obtained. Such a product is substantially free of impurities because no suspending agent, emulsifier or the like is usually used in continuous bulk or solution polymerization. Furthermore, the process of this invention requires neither blending step nor re-extrusion step. Therefore, resins can be obtained with extremely good hues in spite of the addition of the mixture of this invention and when molded, the resultant molded articles are substantially free from development of deteriorated hues or the like. Moreover, the resulting molded articles have good thermal discoloration resistance.

In the process of this invention, other additives may be added within such ranges not deleteriously affecting the advantageous effects of this invention so that the qualities of resulting products will be kept. For example, one or more routinely-employed known weatherability improvers, flame retardants, antioxidants, colorants and/or the like may be employed. Products obtained in accordance with the process of this invention may be used directly as moldable resins. Besides, they may also be used, for the same application, as mixtures with other resins, for example, copolymerized styrene-acrylonitrile resin, polycarbonate, polyvinyl chloride and the like.

The present invention permits production of rubber-modified styrene acrylonitrile resins of superb properties without relying upon any conventional batchwise process. Since it permits efficient addition of higher fatty acid amide and/or metallic soap in any amounts as needed into good mixed state without lowering the productivity and without need for such steps as blending, kneading and the like, it is possible to continuously produce resins having good flowability and mold release properties as well as extremely-improved moldability.

According to the present invention, each resultant resin does not contain impurities such as coagulants unlike those obtained by emulsion polymerization. Despite of an addition of a higher fatty acid amide, it is still possible, without need for a stabilizer like an organic phosphoric acid ester, to produce a rubber-modified styrene-acrylonitrile resin having an extremely good hue and good thermal discoloration resistance. Since the higher fatty acid amide has been mixed and kneaded sufficiently in the resultant resin, the reduction to the heat resistance of the resultant resin has been minimized and the impact resistance and gloss of the resultant resin have been improved.

According to this invention, the mold release properties of a rubber-modified styrene-acrylonitrile resin can be improved by using, as its additive, a mixture of a higher fatty acid amide and a metallic soap of a higher fatty acid. Since the mixture permits it continuous addition in a molten state, both of the blending step and re-extrusion step can be omitted.

Compared with other methods for addition, the addition method of this invention results in pellets having good hues and no substantial deterioration is observed on the hues of articles molded using the resultant pellets. Besides, compared with other additives or other combinations of additives, no substantial corrosion on the extruder and molding machine, no significant adhesion of deposit thereto, no remarkable deterioration of hues, and no substantial reduction to the thermal discoloration resistance and heat resistance are observed but significant improvements to the flowability, moldability and the like are observed.

The present invention will hereinafter be described further by the following Examples. It should however be borne in mind that the present invention is not be limited to or by the following Examples. In the following Examples, all designations of "part" or "parts" mean part or parts by weight.

EXAMPLE 1

A raw material solution was provided by dissolving 6.0 parts of polybutadiene "Asaprene 700A" (trade name; product of Asahi Chemical Co., Ltd.) in a mixture of 55.5 parts of styrene, 18.5 parts of acrylonitrile and 20.0 parts of ethylbenzene. After adding, to the raw material solution, 0.1 part of tert-dodecyl mercaptan, 0.02 part of benzoyl peroxide as a radical polymerization initiator and 0.2 part of 2,6-di-tert-butylphenol as an antioxidant; the resultant mixture was continuously fed at a velocity of 15 liters/hour to a first polymerization vessel having an internal capacity of 18 liters and equipped with a screw-type agitator mounted in a draft tube. After the mixture was polymerized at 115° C. in the first polymerization vessel to form dispersed fine rubber particles, the resultant liquid reaction mixture was continuously drawn out of the first polymerization vessel and then fed to a second polymerization vessel. As the second polymerization vessel, a polymerization vessel of the same type as the first polymerization vessel was employed. The liquid reaction mixture which had been polymerized in the second polymerization vessel was continuously drawn out, followed by its successive feeding to a third, fourth and fifth polymerization vessels. Its polymerization was continued in such a way that its degree of polymerization reached 73% in the fifth polymerization vessel. To a liquid reaction mixture drawn out of the fifth polymerization vessel, having a resin content of 60% and containing 20% of unreacted monomers and 20% of the solvent, ethylenebisstearic acid amide as a higher fatty acid amide was molten at 160° C. and continuously fed at a velocity of 264 g/hr. by a jacketed plunger pump, so that they are mixed together. Thereafter, after removing unreacted monomers and solvent by using a conventionally-known removal and evaporation apparatus, the resin fraction was continuously fed to an extruder to obtain a pelletized ABS resin. During the pelletization, the performance of the extruder did not appear to have dropped compared with its usual performance. The thus-obtained ABS resin contained 3.0% of ethylenebisstearic acid amide and the hue of the pellets was good. The melt flow of the resultant pellets had been improved, compared with that of pellets obtained without any addition in Comparative Example which will be given next. Those pellets were also molded at 220° C. into cups by using an injection molding machine. The force required upon removal of each molded article from the mold was measured as a hydraulic pressure (cup-releasing pressure). The cup-releasing pressure was lower than that required for cups obtained from the resin of Comparative Example 1. Therefore, the mold release properties had been improved. Test pieces were also molded by using the same molding machine, on which physical properties such as Vicat softening point, gloss, Izod impact resistance and the like were measured. Measurement results are summarized in Table 1, along with those obtained in the following Examples 2 and 3 and Comparative Examples 1 to 4. In Table 1, the melt flow *1, mold release properties *2, thermal discoloration resistance *3, gloss *4, Izod impact resistance *5 and Vicat softening point *6 were measured respectively under the following conditions:

*1 ASTM D-1238, 200° C., 5 kg.
*2 Cups were molded at 220° C. Forces (hydraulic pressures) required for the release of the cups from the molds were measured.
*3 The appearance of molded articles after allowed to stand for 2 weeks in a Geer oven of 90° C.
*4 JIS-Z-8741, incident angle: 60°.
*5 ASTM D-256, ¼ inch×$\theta$ inch notched test pieces.
*6 ASTM D-1525, load: 1 kg.

Similarly, measurement results obtained respectively in Examples 4–8 and Comparative Examples 5–11 are given in Table 2, in which the adhesion of deposit to die nozzle of extruder *7, melt flow *1, mold release properties *8, Vicat softening point *6 and thermal discoloration resistance *3 were measured respectively in the above-described or following manner:

*7 The degree of adhesion of deposit at the die nozzle at one end of the extruder was observed while pelletizing for 24 hours.
*8 Cups were molded at 190° C. (for HI-PS) or 220° C. (for ABS and AS), by using the 4-ounce injection molding machine. Forces (hydraulic forces) required for removing the cups from the mold were measured.

COMPARATIVE EXAMPLE 1

An ABS resin was produced in the same manner as in Example 1 except that ethylenebisstearic acid amide was not fed. Although its hue was good, the moldability of the resin such as its flowability and mold release properties was inferior to the resin obtained in Example 1.

COMPARATIVE EXAMPLE 2

After adding and blending 3.0 parts of ethylenebisstearic acid amide to 100 parts of the pellets obtained in Comparative Example 1, the resultant mixture was re-extruded by using a twin-screw extruder as no conventional single-screw extruders were able to extrude the mixture due to their poor feeding performance through their barrels. In the re-extrusion, the extrusion capacity was lowered to about 70%. The re-extruded pellets were somewhat darkened and their hue was deteriorated, although their flowability, mold release properties, etc. had been improved.

COMPARATIVE EXAMPLE 3

A powdery ABS resin was obtained by carrying out the polymerization of styrene and acrylonitrile in the presence of a polybutadiene latex in accordance with emulsion polymerization. After adding and blending 3.0 parts of ethylenebisstearic acid amide to 100 parts of the powder, the resultant mixture was extruded by using a twin-screw extruder to obtain pellets. Although their flowability, mold release properties, etc. had been improved, the pellets were tinged somewhat yellowish. In addition, their molded articles were also yellowed in a thermal discoloration resistance test which was held at 90° C. for 2 weeks on the molded articles.

EXAMPLE 2

An ABS resin was produced in the same manner as in Example 1 except that the addition of ethylenebisstearic acid amide was increased to 440 g/hr. In the thus-obtained ABS resin, 5.0% of ethylenebisstearic acid amide was contained. Its flowability and mold release properties had been both improved, compared with those of the resin obtained in Example 1.

EXAMPLE 3

An ABS resin was produced in the same manner as in Example 1 except that instead of ethylenebisstearic acid amide, oleic acid amide was molten at 100° C. and then added to the outlet of the fifth polymerization vessel. Its flowability and mold release properties had been both improved, compared with those of the resin obtained in Example 1.

COMPARATIVE EXAMPLE 4

An ABS resin was produced in the same manner as in Example 1 except that in lieu of ethylenebisstearic acid amide, stearic acid was molten at 80° C. and then fed at 264 g/hr. to the outlet of the fifth polymerization vessel. Some of the thus-incorporated stearic acid was caused to evaporate together with some unreacted monomers and solvent in the removal and evaporation step. As a result, stearic acid was contained in an amount as little as 2.2% in the thus-obtained ABS resin (yield: 73%). The resultant resin was tinged dark yellowish. It was also discolored into a dark brown color in a thermal discoloration resistance test. Although the flowability, mold release properties and the like of the resin had been improved, it withstandable maximum temperature dropped significantly.

TABLE 1

| | Ex. 1 | Comp. Ex. 1 | Comp. Ex. 2 | Comp. Ex. 3 |
|---|---|---|---|---|
| Production process | Continuous bulk | Continuous bulk | Continuous bulk | Emulsion |
| Additive | Ethylenebis-stearic acid amide | — | Ethylenebis-stearic acid amide | Ethylenebis-stearic acid amide |
| Method for addition | Continuously molten and added to the outlet of 5th polymerization vessel | — | Blended with pellets, followed by re-extrusion through twin-screw extruder | Blended with powder, followed by extrusion through twin-screw extruder |
| Added amount (parts by weight per 100 parts by weight of resin) | 3.0 | — | 3.0 | 3.0 |
| Amount of additive in resin (parts by weight per 100 parts by weight of resin) | 3.0 | — | 3.0 | 3.0 |
| Melt flow *1 (g/10 min.) | 3.5 | 2.0 | 3.4 | 3.5 |
| Mold release properties, (pressure required for the release of cup from mold *2) (kg/cm² G) | 5.6 | 10.2 | 5.9 | 5.3 |
| Hue of pellets | Good | Good | Darkened | Tinged somewhat yellowish |
| Thermal discoloration resistance *3 | Good | Good | Slightly tinged light yellowish | Yellowed |
| Gloss *4 | 73 | 70 | 72 | 79 |
| Izod impact resistance *5 | 11.9 | 11.1 | 10.7 | 12.3 |
| Vicat softening point *6 | 106.9 | 109.5 | 107.1 | 103.8 |

| | Ex. 2 | Ex. 3 | Comp. Ex. 4 |
|---|---|---|---|
| Production process | Continuous bulk | Continuous bulk | Continuous bulk |
| Additive | Ethylenebis-stearic acid amide | Oleic acid amide | Stearic acid |
| Method for addition | Continuously molten and added to the outlet of 5th polymerization vessel | Continuously molten and added to the outlet of 5th polymerization vessel | Continuously molten and added to the outlet of 5th polymerization vessel |
| Added amount (parts by weight per 100 parts by weight of resin) | 5.0 | 3.0 | 3.0 |
| Amount of additive in | 5.0 | 3.0 | 2.2 |

TABLE 1-continued

|  |  |  |  |
|---|---|---|---|
| resin (parts by weight per 100 parts by weight of resin) |  |  |  |
| Melt flow *1 (g/10 min.) | 4.7 | 3.2 | 2.7 |
| Mold release properties, (pressure required for the release of cup from mold *2) (kg/cm² G) | 4.9 | 6.0 | 4.1 |
| Hue of pellets | Good | Good | Tinged dark yellowish |
| Thermal discoloration resistance *3 | Good | Good | Tinged dark brownish |
| Gloss *4 | 75 | 73 | 71 |
| Izod impact resistance *5 | 12.2 | 11.5 | 10.0 |
| Vicat softening point *6 | 106.1 | 106.3 | 103.0 |

EXAMPLE 4:

A raw material solution was prepared by dissolving 6.0 parts of a styrene-butadiene copolymer (product of Asahi Chemical Industry Co., Ltd.; trade name: TOUGHDEN 2000A) in a mixture of 55.5 parts of styrene, 18.5 parts of acrylonitrile and 20.0 parts of ethylbenzene. After adding to the raw material solution 0.1 part of tert-dodecyl mercaptan, 0.02 part of benzoyl peroxide as a radical polymerization initiator and 0.2 part of 2,6-di-tert-butylphenol as an antioxidant, an ABS resin was continuously produced in the same manner as in Example 1, using the same reaction apparatus as that employed in Example 1. The raw material solution was fed at 18 liters/hour to the first reaction vessel, whereas the polymerization temperature in the first reaction vessel was 110° C. A 50/50 (by weight) mixture of ethylenebisstearic acid amide and magnesium stearate was molten at 170° C. and was then fed as an additive to an extruder at a flow velocity of 47 g/hr so that 0.6 part of the mixture was contained per 100 parts of the resin. By the extruder, the mixture and resin were kneaded and then pelletized to obtain an ABS resin. The thus-obtained resin had good mold release properties and its hue was also good.

EXAMPLES 5-8

ABS resins were produced in the same manner as in Example 4 except that the proportions of ethylenebisstearic acid amide and magnesium stearate were changed in Examples 5 and 6 and the mixtures of higher fatty acid amides and metallic soaps of higher fatty acids, which are shown in a table to be given herein, were used as additives in Examples 7 and 8. By the way, the additive was incorporated before the final reaction vessel in Example 5. In each of the Examples, the mold release properties were improved and the hue was also good.

COMPARATIVE EXAMPLE 5

An ABS resin free of any additive was produced in the same manner as in Example 4 except that the mixture of ethylenebisstearic acid amide and magnesium stearate was not added. Its hue and the like were good but the mold release properties of molded articles from the mold were poor.

COMPARATIVE EXAMPLES 6 & 7

ABS resins with mold release agents were each produced by adding and blending, with 100 parts of ABS resin pellets obtained without any mold release agents in the same manner as in Comparative Example 5, 0.3 part of magnesium stearate or 0.6 part of a 50/50 (by weight) mixture of ethylenebisstearic acid amide and magnesium stearate and then re-extruding the resultant resin mixture. The mold release properties of the ABS resin were improved, but the the re-extruded pellets were darkened and their hue was thus aggravated.

COMPARATIVE EXAMPLES 8 & 9

ABS resins were each produced in the same manner as in Example 4 except that instead of the mixture of ethylenebisstearic acid amide and magnesium stearate, 0.3 part of stearic acid or 0.5 part of a 30/70 (by weight) mixture of stearic acid and magnesium stearate was added in a molten state to an extruder. Its mold release properties were improved, but the resultant pellets had a poor hue and their thermal discoloration resistance was also poor. Furthermore, adhesion of deposit was observed at the die nozzle portion of the extruder.

COMPARATIVE EXAMPLE 10

An ABS resin was produced in the same manner as in Example 4 except that instead of the mixture of ethylenebisstearic acid amide and magnesium stearate, 0.6 part of ethylenebisstearic acid amide was molten and added to 100 parts of the resin. Although the hue of the resultant pellets was good, their mold release properties were insufficient.

COMPARATIVE EXAMPLE 11

ABS resin powder was obtained by effecting the polymerization of styrene and acrylonitrile in accordance with emulsion polymerization in the presence of polybutadiene latex. After adding and blending 0.6 part of a 50/50 (by weight) mixture of ethylenebisstearic acid amide and magnesium stearate with 100 parts of the resin powder, the resultant mixture was re-extruded into pellets. The mold release properties were improved but the pellets were tinged somewhat yellowish. They were also turned yellowish in a thermal discoloration test. The Vicat softening point of an article molded from the pellets was lower compared with that in Example 4.

TABLE 2

| | Ex. 4 | Ex. 5 | Ex. 6 | Ex. 7 | Ex. 8 | Comp. Ex. 5 |
|---|---|---|---|---|---|---|
| Experiment No. | | | | | | |
| Resin name | ABS | ABS | ABS | ABS | ABS | ABS |
| Production process | Continuous bulk | Continuous bulk | Continuous bulk | Continuous bulk | Continuous bulk | Continuous bulk |
| Additive Name | Ethylenebis-stearic acid amide/magnesium stearate | Ethylenebis-stearic acid amide/magnesium stearate | Ethylenebis-stearic acid amide/magnesium stearate | Ethylenebis-stearic acid amide/calcium stearate | Stearic acid amide/magnesium stearate | — |
| Composition (amide/soap) | 50/50 | 90/10 | 30/70 | 50/50 | 50/50 | — |
| Method for addition | Molten at 170° C. and added continuously | Molten at 170° C. and added continuously | Molten at 190° C. and added continuously | Molten at 210° C. and added continuously | Molten at 170° C. and added continuously | — |
| Added amount (part by weight per 100 parts by weight of resin) | 0.6 | 3.0 | 0.6 | 0.5 | 0.6 | 0 |
| Adhesion of deposit to die nozzle of extruder *1 | None | None | None | None | None | None |
| Hue of pellets | Good | Good | Good | Good | Good | Good |
| Melt flow *2 (g/10 min.) | 2.1 | 3.1 | 2.0 | 2.1 | 2.2 | 2.0 |
| Mold release properties (pressure required for the release of cup from mold *3) (kg/cm² G) | 6.2 | 5.2 | 6.0 | 6.4 | 6.7 | 10.2 |
| Vicat softening point *4 | 109.2 | 107.6 | 109.4 | 109.2 | 108.9 | 109.5 |
| Thermal discoloration resistance *5 | Good | Good | Good | Good | Good | Good |

| | Comp. Ex. 6 | Comp. Ex. 7 | Comp. Ex. 8 | Comp. Ex. 9 | Comp. Ex. 10 | Comp. Ex. 11 |
|---|---|---|---|---|---|---|
| Experiment No. | | | | | | |
| Resin name | ABS | ABS | ABS | ABS | ABS | ABS |
| Production process | Continuous bulk | Continuous bulk | Continuous bulk | Continuous bulk | Continuous bulk | Emulsion |
| Additive Name | Magnesium stearate | Ethylenebis-stearic acid amide/magnesium stearate | Stearic acid | Stearic acid/magnesium stearate | Ethylenebis-stearic acid amide | Ethylenebis-stearic acid amide/magnesium stearate |
| Composition (amide/soap) | 100 | 50/50 | 100 | 30/70 | 100 | 50/50 |
| Method for addition | Blending, followed by re-extrusion | Blending, followed by re-extrusion | Molten at 80° C. and added continuously | Molten at 110° C. and added continuously | Molten at 160° C. and added continuously | Blended with powder, and then re-extruded |
| Added amount (part by weight per 100 parts by weight of resin) | 0.3 | 0.5 | 0.3 | 0.5 | 0.6 | 0.6 |
| Adhesion of deposit to die nozzle of extruder *1 | None | None | Adhered | Adhered | None | Somewhat adhered |
| Hue of pellets | Darkened | Darkened | Tinged dark yellowish | Tinged dark yellowish | Good | Tinged somewhat yellowish |
| Melt flow *2 (g/10 min.) | 2.0 | 2.1 | 2.1 | 2.1 | 2.2 | 2.3 |
| Mold release properties (pressure required for the release of cup from mold *3) (kg/cm² G) | 6.7 | 6.1 | 6.2 | 6.0 | 8.0 | 5.9 |
| Vicat softening point *4 | 109.5 | 109.3 | 108.9 | 109.2 | 108.8 | 106.2 |
| Thermal discoloration resistance *5 | Tinged light yellowish | Slightly tinged light yellowish | Tinged dark brown | Tinged dark brown | Good | Tinged yellowish |

What is claimed is:

1. In a process for producing a styrene-base resin by continuous bulk polymerization or solution polymerization, the improvement wherein, in the course of the process, one or more higher fatty acid amides represented by the following formula (I):

$$R_1CONHR_2 \quad (I)$$

wherein $R_1$ is an alkyl group having 8 to 22 carbon atoms, $R_2$ is hydrogen, a hydroxymethyl group or $\text{-(CH}_2\text{)}_n\text{NHCOR}^3$, wherein $R^3$ is an alkyl group having 8 to 22 carbon atoms and can be same as or different from $R_1$, and n is 1 or 2, are continuously added in a dissolved or molten state to a continuous flow of the styrene-base resin in a molten or dissolved state so that a styrene-base resin having excellent moldability and a good hue is produced.

2. The process as claimed in claim 1 wherein the higher fatty acid amide is added in a state dissolved or molten at 60° C. or higher and in an amount of 1.0 to 8.0 parts by weight per 100 parts by weight of the resin.

3. The process as claimed in claim 1 wherein the higher fatty acid amide is continuously added to a liquid reaction mixture containing 10 to 10,000 parts by weight of monomers and solvent, which have been used for the formation of the resin, per 100 parts by weight of the resin and the monomers and solvent are separated from the resin so as to obtain the styrene-base resin.

4. The process as claimed in claim 1 wherein the higher fatty acid amide is lauric acid amide, stearic acid amide, behenic acid amide, methylenebislauric acid amide, ethylenebislauric acid amide, methylenebisstearic acid amide, ethylenebisstearic acid amide, methylenebisbehenic acid amide or ethylenebisbehenic acid amide.

5. The process as claimed in claim 1 wherein the styrene-base resin is a rubber-modified styrene-acrylonitrile copolymer.

6. The process as claimed in claim 1 wherein a mixture consisting of (a) one or more higher fatty acid amides of the formula (I) and (b) one or more of metallic soaps of higher fatty acids having 8 to 22 carbon atoms, the mixing proportions (a)/(b) being from 10/90 to 90/10 by weight, is continuously added in a molten state and in such an amount that the one or more metallic soaps (b) are added in a total amount of 0.1 to 1.0 part by weight per 100 parts by weight of the resin, thereby forming a styrene-base resin having excellent mold release properties and a good hue.

7. The process as claimed in claim 6 wherein the higher fatty acid amide is lauric acid amide, stearic acid amide, behenic acid amide, methylenebislauric acid amide, ethylenebislauric acid amide, methylenebisstearic acid amide, ethylenebisstearic acid amide, methylenebisbehenic acid amide or ethylenebisbehenic acid amide.

8. The process as claimed in claim 6 wherein the metallic soap of the higher fatty acid is aluminum stearate, calcium stearate, zinc stearate, magnesium stearate or calcium stearate.

9. The process as claimed in claim 6 wherein the metallic soap of the higher fatty acid is a magnesium soap or calcium soap.

10. The process as claimed in claim 6 wherein the mixture is fed in a molten state by a fixed displacement pump to a constant flow of a polymerization mixture.

* * * * *